United States Patent
Zhang et al.

(10) Patent No.: US 12,138,621 B2
(45) Date of Patent: Nov. 12, 2024

(54) CATALYTIC CRACKING CATALYST AND PREPARATION PROCESS THEREOF

(71) Applicants: CHINA PETROLEUM & CHEMICAL CORPORATION, Beijing (CN); RESEARCH INSTITUTE OF PETROLEUM PROCESSING, SINOPEC, Beijing (CN)

(72) Inventors: Jiexiao Zhang, Beijing (CN); Shanqing Yu, Beijing (CN); Mingde Xu, Beijing (CN); Jiasong Yan, Beijing (CN); Huiping Tian, Beijing (CN); Jiaxing Li, Beijing (CN); Min Yang, Beijing (CN)

(73) Assignees: CHINA PETROLEUM & CHEMICAL CORPORATION, Beijing (CN); RESEARCH INSTITUTE OF PETROLEUM PROCESSING, SINOPEC, Beijing (CN)

( * ) Notice: Subject to any disclaimer, the term of this patent is extended or adjusted under 35 U.S.C. 154(b) by 336 days.

(21) Appl. No.: 17/599,184

(22) PCT Filed: Mar. 26, 2020

(86) PCT No.: PCT/CN2020/081358
§ 371 (c)(1),
(2) Date: Sep. 28, 2021

(87) PCT Pub. No.: WO2020/192724
PCT Pub. Date: Oct. 1, 2020

(65) Prior Publication Data
US 2022/0184589 A1   Jun. 16, 2022

(30) Foreign Application Priority Data
Mar. 28, 2019   (CN) .......................... 201910241402.3

(51) Int. Cl.
| | | |
|---|---|---|
| B01J 37/10 | (2006.01) | |
| B01J 21/04 | (2006.01) | |
| B01J 29/08 | (2006.01) | |
| B01J 35/61 | (2024.01) | |
| B01J 35/63 | (2024.01) | |
| B01J 35/64 | (2024.01) | |
| B01J 37/00 | (2006.01) | |
| B01J 37/03 | (2006.01) | |
| B01J 37/04 | (2006.01) | |
| B01J 37/08 | (2006.01) | |
| C01F 7/30 | (2022.01) | |
| C10G 11/05 | (2006.01) | |

(52) U.S. Cl.
CPC ............. B01J 29/088 (2013.01); B01J 21/04 (2013.01); B01J 35/615 (2024.01); B01J 35/633 (2024.01); B01J 35/647 (2024.01); B01J 35/651 (2024.01); B01J 37/0009 (2013.01); B01J 37/038 (2013.01); B01J 37/04 (2013.01); B01J 37/082 (2013.01); B01J 37/10 (2013.01); C01F 7/30 (2013.01); C10G 11/05 (2013.01); C10G 2300/202 (2013.01); *C10G 2300/205* (2013.01); *C10G 2300/301* (2013.01); *C10G 2300/302* (2013.01); *C10G 2300/308* (2013.01); *C10G 2300/70* (2013.01); *C10G 2400/02* (2013.01); *C10G 2400/04* (2013.01)

(58) Field of Classification Search
CPC ... B01J 21/04; B01J 23/78; B01J 29/00; B01J 29/088; B01J 29/146; B01J 29/46; B01J 29/7615; B01J 29/80; B01J 35/1019; B01J 35/1038; B01J 35/1061; B01J 35/1066; B01J 35/10; B01J 35/109; B01J 35/1095; B01J 37/0009; B01J 37/04; B01J 37/038; B01J 37/082; B01J 37/10; B01J 37/0045; B01J 37/033; C01F 7/30; C01F 7/20; C01F 7/441; C01F 7/02; C10G 11/05; C10G 11/18; C10G 2300/205; C10G 2300/301; C10G 2300/302; C10G 2300/308; C10G 2300/70; C10G 2400/02; C10G 2400/04; C01P 2006/12; C01P 2006/14; C01P 2006/16; C01P 2006/17; C01P 2006/80
USPC ............... 502/60, 63, 64, 67, 68, 69, 77, 79
See application file for complete search history.

(56) References Cited

U.S. PATENT DOCUMENTS

| | | | |
|---|---|---|---|
| 6,451,200 B1 | 9/2002 | Lussier et al. | |
| 7,169,294 B2 | 1/2007 | Abe et al. | |
| 2004/0138317 A1 | 7/2004 | Xie et al. | |
| 2009/0118556 A1* | 5/2009 | Euzen .................... | C10G 47/14 502/64 |

(Continued)

FOREIGN PATENT DOCUMENTS

| | | |
|---|---|---|
| CN | 1169336 A | 1/1998 |
| CN | 101121120 A | 2/2008 |

(Continued)

*Primary Examiner* — Smita S Patel
(74) *Attorney, Agent, or Firm* — NKL Law; Allen Xue

(57) ABSTRACT

The catalytic cracking catalyst contains a molecular sieve and an alumina substrate material. The alumina substrate material has a crystalline phase structure of γ-alumina. Based on the volume of pores with a diameter of 2-100 nm, the pore volume of the pores with a diameter of 2-5 nm accounts for 0-10%, the pore volume of the pores with a diameter of more than 5 nm and not more than 10 nm accounts for 10-25%, and the pore volume of the pores with a diameter of more than 10 nm and not more than 100 nm accounts for 65-90%.

17 Claims, No Drawings

(56) References Cited

U.S. PATENT DOCUMENTS

2010/0176030 A1     7/2010   Liu et al.
2010/0270210 A1*   10/2010   Long ........................ B01J 29/80
                                                                          502/67

FOREIGN PATENT DOCUMENTS

| CN | 101745373 A | 6/2010 |
|---|---|---|
| CN | 101745417 A | 6/2010 |
| CN | 103936399 A | 7/2014 |
| CN | 104014361 A | 9/2014 |
| CN | 105983446 A | 10/2016 |
| CN | 106391105 A | 2/2017 |
| CN | 106660019 A | 5/2017 |
| CN | 107149917 A | 9/2017 |
| CN | 104014361 B | 3/2018 |
| CN | 108483473 A | 9/2018 |
| CN | 108745409 A | 11/2018 |
| EP | 2161077 A1 | 3/2010 |
| JP | S565373 A | 1/1981 |
| JP | 2017087204 A | 5/2017 |
| RU | 2351393 C2 | 4/2009 |
| RU | 2471553 C2 | 1/2013 |
| TW | 201833029 A | 9/2018 |
| WO | 2018153302 A1 | 8/2018 |

* cited by examiner

CATALYTIC CRACKING CATALYST AND PREPARATION PROCESS THEREOF

TECHNICAL FIELD

The invention relates to a catalytic cracking catalyst and a preparation process thereof.

BACKGROUND

With the petroleum resources are becoming heavier and heavier, and also are more and more deteriorated, the reasonable utilization of inferior residual oil is a difficult problem in the oil refining industry. The catalytic cracking (FCC) has the advantages of strong raw material adaptability, high yield of light oil products, high gasoline octane number and the like, and is the most important crude oil secondary processing process for oil refining enterprises in China. The crux of catalytic cracking is the catalyst. However, the inferior-quality residual oil contains high contents of impurities such as heavy metals, S, N, carbon residue and the like, which easily causes severe poisoning and pollution of the catalytic cracking catalyst, leads to the reduction of catalytic performance, and influences the distribution of catalytic cracking products, thereby influencing the yield of oil refining.

Conventional FCC catalysts are generally composed of a substrate and a molecular sieve, wherein the molecular sieve is the active center of the catalyst. In order to make FCC have good heavy oil conversion capability, cracking catalyst is required to have higher reaction activity, however, the requirement on activity by conversion of inferior oil cannot be completely met by simply increasing the content of active components. At the same time, too high content of active components causes the problem of too high coke yield, which affects the material balance, heat balance and benefit of catalytic cracking unit.

CN104014361B discloses a catalytic cracking catalyst and its preparation process. The catalytic cracking catalyst includes modified double-hole distribution alumina, molecular sieve, binder and clay; the molecular sieve is FAU structure zeolite, the modified double-pore distribution alumina contains rare earth and silicon modified elements based on the weight of the modified double-pore distribution alumina as a reference, the modified double-pore distribution alumina has a crystalline phase structure of γ-alumina, the mode pore diameter is 4-10 nm and 10-25 nm, the specific surface area is 250-500 m$^2$/g, and the pore volume is 0.6-1.8 cm$^3$/g. The preparation process of the catalyst comprises the steps of carrying out spray drying, molding and calcinating on slurry comprising the modified double-pore distributed alumina, the molecular sieve, the clay and the binder, and then washing, filtering and drying to obtain a finished catalyst product. The catalytic cracking catalyst can improve the quality of gasoline and the yield of liquid products, and has stronger heavy oil cracking capability under the condition of metal pollution. However, when the catalyst is used for processing inferior-quality oil products, it has poor carbon deposition resistance and poor heavy metal pollution resistance.

SUMMARY OF THE INVENTION

The technical problem to be solved by the invention is to provide an alumina substrate material for inferior heavy oil cracking, and a catalytic cracking catalyst comprising the alumina substrate material, aiming at the defects of the prior art. Another technical problem to be solved by the invention is to provide a preparation process and use of the substrate material and the catalyst.

The invention provides an alumina material, which has a crystalline phase structure of γ-alumina, wherein the crystallinity of the γ-alumina is 40-60%; based on the volume of pores with a diameter of 2-100 nm, the pore volume of the pores with a diameter of 2-5 nm accounts for 0-10%, the pore volume of the pores with a diameter of more than 5 nm and not more than 10 nm accounts for 10-25%, the pore volume of the pores with a diameter of more than 10 nm and not more than 100 nm accounts for 65-90%, and the mode pore diameter can be 10-25 nm; and the ratio of B-acid to L-acid is 0.06-0.1.

In the present invention, the specific surface area is determined by the low-temperature nitrogen adsorption method (BET method, see GB/T5816-1995 for measurement of catalyst and adsorbent surface area).

In the present invention, the pore volume is measured by a low-temperature nitrogen adsorption method (BET method).

The elemental composition is determined by X-ray fluorescence spectroscopy.

The phase and crystallinity data is measured by X-ray diffraction method, see RIPP 141-90, γ-Alumina Crystallinity Assay, petrochemical analysis (RIPP test methods), Scientific Press, 1990.

The acid center type and the acid amount are analyzed and measured by an in-situ pyridine adsorption infrared measurement method, with a desorption temperature of 200° C.

The alumina material of the invention comprises $Al_2O_3$ in an amount of not less than 95 wt % on a dry basis weight (abbreciated as dry basis), for example, 95-99.5 wt %, or 95-99 wt %, or 96-98 wt %. The dry basis weight can be measured by calcining at 800° C. for 1 hour. The content of oxide other than aluminas (other oxides) is not more than 5 wt %, for example from 0.5 to 5 wt % or from 1 to 5 wt % or from 2 to 4 wt %.

The alumina material according to the present invention comprises $Fe_2O_3$ in an amount of not more than 1.5 wt %, such as not more than 0.5 wt %, or from 0.1 to 0.5 wt %, or from 0.2 to 0.4 wt %, on a dry basis (i.e., on a dry basis weight).

The alumina material according to the present invention comprises $Na_2O$ preferably in an amount of not more than 1 wt %, such as not more than 0.5 wt %, or 0.01-0.5 wt %, or 0.01-0.2 wt %, more preferably not more than 0.1 wt %, based on the dry basis weight.

The alumina material according to the present invention comprises $SiO_2$ preferably in an amount of not more than 1.5 wt %, such as not more than 0.5 wt %, or 0.1-1.5 wt %, preferably not more than 0.4 wt % or not more than 0.3 wt %, based on the dry basis weight.

The alumina material according to the invention has a specific surface area of 200-300 m$^2$/g.

The alumina material according to the present invention preferably has a total pore volume of 0.35 to 0.45 ml/g. The total pore volume is measured by a water-drop method (see RIPP28-90, edited by Yang Cuiding et al, Petrochemical Analysis Method (RIPP test method), Scientific Press, 1990).

For the alumina material according to the present invention, the pores having a pore diameter of 2 to 100 nm have a pore volume of 0.25 to 0.40 ml/g, as measured by a BET method.

For the alumina material according to the present invention, the pores having a pore diameter of more than 10 nm and not more than 20 nm have a pore volume of preferably 0.06 to 0.08 ml/g.

For the alumina material according to the present invention, the pores having a pore diameter of more than 20 nm and not more than 30 nm have a pore volume of preferably 0.06 to 0.08 ml/g.

For the alumina material according to the present invention, the pores having a pore diameter of more than 30 nm and not more than 40 nm have a pore volume of preferably 0.03 to 0.04 ml/g.

For the alumina material according to the present invention, the pores having a pore diameter of more than 40 nm and not more than 50 nm have a pore volume of preferably 0.03 to 0.04 ml/g.

According to the alumina material of the present invention, the alumina material preferably has a B-acid amount of 1-3 µmol·g$^{-1}$, for example, 1.1-2.5 µmol·g$^{-1}$.

According to the alumina material of the present invention, the alumina material preferably has a L-acid amount of 10-40 µmol·g$^{-1}$, such as 13-31 µmol·g$^{-1}$.

The alumina material according to the invention has preferably a B-acid/L-acid ratio of 0.065-0.085.

The invention also provides a preparation process for preparing the alumina material, comprising the steps of:

mixing an aluminum source of Al(OH) structure (calculated as alumina), an aluminum source of Al(OH)$_3$ structure (calculated as alumina), a pore-expanding agent and water at a molar ratio of 0.5-2: 0.5-2: 0.5-2: 5-20, for example, the molar ratio of an aluminum source of Al(OH) structure, an aluminum source of Al(OH)$_3$ structure, a pore-expanding agent and water can be 0.8-1.2: 0.8-1.2: 0.8-1.2: 8-12;

carrying out an aging treatment under water vapor, and optionally drying, to obtain a precursor of the alumina material, wherein the aging treatment can be carried out at a temperature of more than 100-200° C., preferably 110-180° C., such as 120-150° C., for preferably 2-5 h, and the drying temperature is not more than 200° C., such as 100-140° C.;

calcinating the precursor of the alumina material to obtain the alumina material (also called as alumina substrate or alumina substrate material) provided by the invention, for which the calcinating is carried out at a temperature of 500-1000° C., for example 500-700° C., for preferably 2-6 hours, for example 2.5-4 hours.

According to the preparation process for the alumina material, the aluminum source of Al(OH) structure, also called as Al(OH) source or called as the first aluminum source, can be one or more selected from the group consisting of pseudo-boehmite, boehmite and boehmite; and the aluminum source of Al(OH)$_3$ structure, also called as Al(OH)$_3$ source or called as the second aluminum source), may be one or more selected from the group consisting of Gibbsite, bayerite, nordstrandite, and amorphous aluminum hydroxide.

The amorphous aluminum hydroxide is commercially available or can be obtained by reacting a soluble aluminum salt with alkali, e.g., amorphous alumina prepared by reacting an aluminum sulfate or aluminum chloride with sodium hydroxide or sodium metaaluminate.

According to the preparation process for the alumina material of the present invention, in one embodiment, the aluminum source of Al(OH) structure has the following properties: on a dry basis, a Al$_2$O$_3$ content of not less than 95 wt %; a Fe$_2$O$_3$ content of not more than 1.5 wt %, for example, 0.01 to 1.5 wt %, more preferably not more than 0.5 wt % or not more than 0.3 wt %; a Na$_2$O content of not more than 1 wt %, for example, 0.01 to 1 wt %, more preferably not more than 0.5 wt % or not more than 0.2 wt %; a SiO$_2$ content of not more than 1.5 wt %, for example, 0.1 to 1.5 wt %, more preferably not more than 0.5 wt % or not more than 0.3 wt %; and the aluminum source of Al(OH)$_3$ structure has the following properties: on a dry basis, an Al$_2$O$_3$ content of not less than 95 wt %, an O$_2$ content of not more than 1.5 wt %, for example, 0.01 to 1.5 wt %, more preferably not more than 0.5 wt % or not more than 0.3 wt %, a Fe$_3$O$_2$ content of not more than 1 wt %, for example, 0.01 to 1 wt %, more preferably not more than 0.5 wt % or not more than 0.2 wt %, a Na$_2$O content of not more than 1.5 wt %, for example, 0.1 to 1.5 wt %, more preferably not more than 0.5 wt % or not more than 0.3 wt %.

According to the preparation process for the alumina material, the pore-expanding agent is one or more selected from the group consisting of ammonium bicarbonate, activated carbon, EDTA, n-butylamine, polyacrylamide, n-butanol and citric acid, such as one or more selected from the group consisting of citric acid, ammonium bicarbonate, n-butylamine and activated carbon; preferably one or more selected from the group consisting of ammonium bicarbonate, citric acid and activated carbon.

According to the preparation process for preparing the alumina material of the present invention, in one embodiment, the alumina material precursor comprises: on a dry basis, a Al$_2$O$_3$ content of not less than 95 wt %, a Fe$_2$O$_3$ content of not more than 1.5 wt %, for example, in the range of 0.1 to 1.5 wt %, a Na$_2$O content of not more than 1 wt %, for example, in the range of 0.01 to 1 wt %, and a SiO$_2$ content of not more than 1.5 wt %, for example, in the range of 0.1 to 1.5 wt %; and a specific surface area of 300-380 m$^2$/g. The specific surface area is determined by low-temperature nitrogen adsorption method, and the elemental composition is determined by X-ray fluorescence spectrometry.

The invention further provides a catalytic cracking catalyst, comprising, on a dry basis (dry basis weight, abbreviated as dry basis, which is the weight of solid after 1-hour calcination at 800° C.), molecular sieve in an amount of 25-50 wt %, preferably 25-35 wt %; clay in an amount of 0-50 wt %, e.g. 10-40 wt %, preferably 0-30 wt %; binder in an amount of 5-35 wt % or 10-30 wt %, preferably 15-28 wt %; and the alumina material (also called as alumina substrate) provided by the invention in an amount of 2-30 wt %, preferably 5-25 wt %, or 5-15 wt %, or 10-20 wt %. The molecular sieve is one or more selected from the group consisting of Y-type molecular sieve, ZSM-5 molecular sieve and β-molecular sieve. In order to have a higher gasoline yield, the molecular sieve is preferably Y-type molecular sieve, and the Y-type molecular sieve is one or more selected from the group consisting of HY, USY, REY, REHY, REUSY, a Y-type molecular sieve comprising phosphorus, a Y-type molecular sieve comprising phosphorus and rare earth, a USY molecular sieve comprising phosphorus and rare earth, and modified Y zeolites with various silica-alumina ratios prepared by a gas phase chemical method (a method of removing Al and supplementing Si for SiCl$_4$), a liquid phase chemical method (a method of removing Al and supplementing Si for (NH$_4$)$_2$SiF$_6$) and other methods. The binder is one or more selected from the group consisting of alumina binder, silica binder, silica-alumina binder, magnesium-aluminum binder, zirconium binder and titanium binder, preferably alumina binder, and the alumina binder is pseudo-boehmite and/or alumina sol. The clay is preferably one or more selected from the group consisting of kaolin, montmorillonite, diatomaceous earth, halloysite, pseudohalloy site, saponite, rectorite, sepiolite, attapulgite, hydrotalcite and bentonite, for example the clay is one or more selected from the group consisting of kaolin and halloysite.

The catalytic cracking catalyst according to the invention has, on a dry basis, a weight ratio of the molecular sieve to the alumina material according to the invention of 1-7:1, such as 1.2-5:1, wherein the molecular sieve is preferably a Y-type molecular sieve. In one embodiment, the total content of molecular sieve and the alumina according to the invention is in the range of from 30 to 55 wt %, such as from 40 to 50 wt %.

In one embodiment, the catalyst of the invention has a bimodal pore structure, wherein based on the pores in the range of 0-100 nm, the catalyst comprises 30-55%, preferably 40-55%, of pores in the range of 0-3 nm; and 30-55%, preferably 40-55%, of pores in the range of 5-100 nm. In one embodiment, the catalyst of the present invention has a bimodal pore structure, wherein based on the pores in the range of 1-100 nm, the catalyst comprises 40-55% of pores in the range of 1-3 nm and 40-55% of pores in the range of 5-100 nm.

The invention further provides a preparation process for the catalytic cracking catalyst, comprising the steps of: pulping a binder, clay, a molecular sieve and an alumina substrate material to obtain a catalyst slurry, and spray-drying the catalyst slurry, wherein the alumina substrate material is the alumina material according to the invention or the alumina material prepared by the preparation process for the alumina material according to the invention.

The alumina material according to the invention is an alumina substrate material with optimized performance, has high catalytic cracking activity on hydrocarbon oil and high stability, which can be used for converting inferior hydrocarbon oil with good carbon deposition resistance. When the alumina material according to the present invention is used for a cracking catalyst, the dosage of the molecular sieve of the cracking catalyst can be reduced, and the heavy oil conversion activity is kept as high under the condition of reducing the dosage of the molecular sieve, and the coke yield is low. In addition, a catalytic cracking catalyst comprising the alumina material according to the invention has good wear resistance.

The preparation process for the alumina material according to the invention is simple and easy to carry out, without the need of expensive organic aluminum source, which results in lower preparation cost. The alumina material prepared by the preparation process according to the invention has good inferior hydrocarbon oil processing performance, high conversion activity on inferior oil, high gasoline yield and low coke yield.

The catalytic cracking catalyst according to the invention contains molecular sieve and the alumina material according to the invention, which can improve the overall cracking capability and the metal pollution resistance of the catalyst by developing a matched substrate primary cracking and protection functions. When the catalytic cracking catalyst according to the invention is used for catalytic cracking conversion of inferior heavy oil, at least one of the following beneficial effects can be obtained: (1) high conversion activity of heavy oil; (2) high yield of light oil; (3) low yield of coke; (4) outstanding heavy metal pollution resistance, with relatively high conversion activity of heavy oil after metal pollution, resulting in high yield of light oil and low selectivity to coke; (5) significantly improved yield of gasoline in a cracked product and increased yield of liquid, in case of a a Y-type molecular sieve being used, compared with the conventional cracking catalyst using an alumina substrate.

EMBODIMENTS OF THE INVENTION

According to the process for preparing the alumina material of the invention, an aluminum source of Al(OH) structure, an aluminum source of Al(OH)$_3$ structure, a pore-expanding agent and water are formed into a mixture, which mixture is subjected to aging treatment at a temperature of more than 100-200° C., such as 110-180° C. or 120-180° C., wherein the aging treatment is carried out in the presence of water vapor, for preferably 2-5 hours. The so-called "in the presence of water vapor" denotes that the atmosphere contacting with the mixture of the aluminum source of Al(OH) structure, the aluminum source of Al(OH)$_3$ structure and the pore-expanding agent is a water vapor atmosphere comprising water vapor. The water vapor atmosphere usually contains 2-100 vol % (such as 5-100 vol %, preferably 50-100 vol %) of water vapor. The aging treatment is generally carried out at normal pressure, such as 1 atm absolute pressure. The product after the aging treatment can be dried and then calcinated, or directly calcinated. The drying process can remove water vapor carried in the aged mixture, thereby reducing the calcinating cost. Typically, the temperature of drying is not more than 200° C., e.g., 110-180° C. or 120-150° C. The drying can be performed in an air atmosphere. Preferably, the aging treatment is carried out by contacting the aluminum source of Al(OH) structure and the aluminum source of Al(OH)$_3$ structure of the mixture in a solid state with water vapor at 110-200° C., preferably at 120-180° C. for 2-5 hours, followed by drying.

One embodiment of the preparation process for preparing the alumina material according to the invention comprises: homogeneously mixing an Al(OH) source (calculated as Al$_2$O$_3$), an Al(OH)$_3$ source (calculated as Al$_2$O$_3$), a pore-expanding agent and water at a molar ratio of 0.5-2: 0.5-2: 0.5-2: 5-20 (calculated as Al$_2$O$_3$), and aging the obtained mixture in the presence of water vapor at a temperature of more than 110-200° C., such as 120-180° C. or 120-150° C., for 2-5 h. During the aging treatment, the water outside the solid in the mixture is evaporated at the boiling point to form the mixture into a solid state, then the solid state is contacted with water vapor at a temperature of 110-180° C. to perform aging treatment for 2-5 h. The obtained solid is dried in an air atmosphere at a temperature of 100-180° C., e.g., at a temperature of 120-150° C., to obtain a precursor of the alumina material. The obtained precursor of the alumina material is calcinated at 500-1000° C. for 2-5 hours, for example, at 500-700° C. for 3-5 hours, so as to provide the alumina material or alumina substrate according to the invention.

Preferably, the alumina material obtained by the preparation process for the alumina material according to the invention has, on a dry basis, an Al$_2$O$_3$ content of not less than 95 wt %, such as 95-99 wt %, a Fe$_2$O$_3$ content of not more than 1.5 wt %, such as 0.1-1.5 wt %, a Na$_2$O content of not more than 1 wt %, such as 0.01-1 wt %, a Si$_2$O content of not more than 1.5 wt %, such as 0.1-1.5 wt %, a specific surface area of 200-300 m$^2$/g and a total pore volume of 0.35-0.45 ml/g. The finished product of the alumina material has a crystalline phase structure of γ-alumina, and the crystallinity of the γ-alumina is 40-60%; wherein based on the volume of pores with a diameter of 2-100 nm, the pore volume of the pores with a diameter of 2-5 nm accounts for 0-10%, the pore volume of the pores with a diameter of more than >5-10 nm accounts for 10-25%, and the pore volume of the pores with a diameter of more than >10-100 nm accounts for 65-90%; and the mode pore diameter is 10-25 nm. The finished product of the alumina material contains B-acid and L-acid, having a ratio of the B-acid to the L-acid of 0.06-0.1. In one embodiment, in the alumina material, the amount of B-acid is 1-3 $\mu mol \cdot g^{-1}$, and the amount of L-acid is 10-40 $\mu mol \cdot g^{-1}$.

In one embodiment, the present invention provides a preparation process for preparing a catalytic cracking catalyst, comprising: pulping a binder, a clay, a molecular sieve and an alumina material to obtain a catalyst slurry, and spray-drying the catalyst slurry. The solid content of the catalyst slurry is preferably 20 wt % or more, more preferably 25 wt % or more, for example, 30 wt % to 40 wt %.

According to the preparation process for the catalytic cracking catalyst of the present invention, the clay is a clay raw material well known to those skilled in the art, and the commonly used clay species can be used in the present invention. For the present invention, the clay is preferably one or more selected from the group consisting of kaolin, montmorillonite, diatomaceous earth, halloysite, pseudohalloysite, saponite, rectorite, sepiolite, attapulgite, hydrotalcite and bentonite. For example, the clay is one or more selected from the group consisting of kaolin and halloysite.

According to the preparation process for the catalytic cracking catalyst according to the invention, the binder can be a binder well known to a person skilled in the art, and can be one or more selected from the group consisting of acidified pseudoboehmite, aluminum sol, silica sol, magnesium-aluminum sol, zirconium sol and titanium sol, and preferably acidified pseudoboehmite and/or aluminum sol.

In one embodiment, the preparation process for the catalytic cracking catalyst comprises, pulping the molecular sieve and water, for which the solid content of the pulping is not more than 30%, and the pulping duration is 0.5-1 h; followed by adding kaolin, a half of a preset amount of the alumina material, and the aluminum sol, continuing pulping for 2-4 h, adding acidified pseudo-boehmite, stirring for 1 h, finally adding the other half of the preset amount of the alumina material, stirring for 0.5-1 h, and spray-forming the obtained slurry to obtain catalyst microspheres. The catalyst microspheres are calcined at a temperature above 500° C. (preferably 650-800° C.) for more than 2 hours, and the resulting catalyst is washed and dried.

Without being limited with any known theory, it is believed that in the process of the present invention, in one embodiment, a preset amount of alumina is added in two steps, while the alumina sol is added in one step, so that on one hand, the outer surface of the catalyst forms an encapsulate of multi-layer macroporous structure, thereby reducing the loss of the porous structure, and on the other hand, the catalyst is calcined at a high temperature of more than 500° C. to generate a pore distribution of 5-100 nm in a range of 30-55%.

In one embodiment, the aluminum sol useful in the present invention may be prepared according to the process described in CN 201610124722.7. Without being limited with any known theory, it is believed that for the purposes of the present invention, the process produces an aluminum sol with low amount of free ions of chloride, a high pH, a high degree of polymerization between Al and Cl, and large particles of the aluminum sol, which on the one hand damages less to the molecular sieve and alumina substrate channels, and on the other hand clogs less the macroporous structure of the alumina substrate. Meanwhile, during the procedures of the preparation process, an adhesive (aluminum sol and pseudo-boehmite) is used for pulping and dispersing the kaolin and the alumina substrate, followed by the addition of molecular sieve, so that the gelling period is shortened, the free chlorine in the aluminum sol is less, and the damage of the aluminum sol to the alumina substrate and to the molecular sieve is reduced, According to the preparation process for the catalytic cracking catalyst according to the invention, the molecular sieve is a molecular sieve raw material well known in the field, and any molecular sieve commonly used in the field can be used for the invention. For example, the molecular sieve is a Y-type molecular sieve, any other zeolites with high silica-alumina ratio or a mixture thereof. The Y-type molecular sieve is, for example, one or more selected from the group consisting of HY, USY, USY comprising one or more selected from the group consisting of P, RE, Mg and Fe, REY, REHY, Y-type molecular sieve comprising phosphorus, Y-type molecular sieve comprising phosphorus and rare earth, and USY molecular sieve comprising phosphorus and rare earth, wherein the USY molecular sieve can be Y zeolite with different Si/Al ratios prepared by a gas phase chemical method (a method of removing Al and supplementing Si for $SiCl_4$), a liquid phase chemical method (a method of removing Al and supplementing Si for $(NH_4)_2SiF_6$) and other methods, or a mixture thereof. The other zeolites with high silica-alumina ratio comprise, such as, MFI structure zeolites, such as ZSM-5 zeolite, and/or BEA structure zeolites, such as β-zeolite.

According to the preparation process for the catalytic cracking catalyst according to the invention, the content of the molecular sieve in the catalytic cracking catalyst is preferably 25 wt % or more. Preferably, the catalytic cracking catalyst obtained by the preparation process for the catalytic cracking catalyst according to the invention comprises, by weight on a dry basis: molecular sieve in an amount of 25-50 wt %, preferably 25-35 wt % of; clay in an amount of 0-50 wt %, preferably 0-40 wt % or 0-30 wt %, e.g. 10-40 wt %; binder in an amount of 5-40 wt %, e.g. 10-30 wt %, preferably 15-28 wt %; alumina materials provided by the present invention in an amount of 2 to 30 wt %, preferably 3 to 25 wt %, or 5 to 20 wt %, or 5 to 15 wt %.

The following Examples further illustrate the features of the present invention, but the present invention is not limited to the Examples.

The specifications of the raw materials used in the Examples and Comparative Examples are as follows:

Kaolin: a solid content of 81.2 wt %, produced by China Kaolin Clay Co., Ltd. (Suzhou);

Citric acid, ammonium bicarbonate, n-butylamine, and glucose: analytically pure;

Alumins sol: 22 wt % of $Al_2O_3$, produced by Qilu Division of Sinopec Catalyst Co.,Ltd.;

Pseudo-boehmite: solid content 72 wt %, from Shandong division of Aluminum Corporation of China;

Aluminum Source of Al(OH) structure: a macroporous pseudo-boehmite with a pore volume of 0.82 mL/g, a specific surface area of 285 $m^2/g$ and a gibb site content of 3 wt %; and on a dry basis, 96 wt % of $Al_2O_3$ and less than 0.1 wt % of $Na_2O$, from Shandong Shanlvyifeng Aluminum-based New Material Co., Ltd, brand number P-DF-07-Lsi;

Aluminum source of $Al(OH)_3$ structure: gibbsite, $Al_2O_3$ content of 97 wt %, $Fe_2O_3$ content of 0.3 wt %, $Na_2O$ content of 0.4 wt %, and Na$_2$O content of 0.3 wt %, based on dry basis, from Zibo Yaohe Aluminum Co., Ltd.;

The molecular sieve used is REY type molecular sieve: produced by Qilu Division of Sinopec Catalyst Co., Ltd., with a solid content of 80 wt %, and a rare earth content (calculated by RE$_2$O$_3$ 1) of 17.2 wt %; and The composition of the catalyst obtained in the catalyst preparation Example is determined by calculation from the feeding amount of each raw material.

The characterization methods comprise:

(1) XRF fluorescence analysis (RIPP 117-90 Standard method (edited by Yang Cuiding et al, Petrochemical Analysis Method (RIPP test method), Scientific Press, 1990)).

(2) The specific surface area of the cracking catalyst is measured using an Autosorb-1 nitrogen adsorption/desorption apparatus from Congta, USA, according to GB/T5816-1995 method, which requires the sample to be degassed at 300° C. for 6 hours before the measurement. The pore diameter and the average pore diameter are calculated by a BJH model.

(3) The phase and crystallinity are measured by X-ray diffraction. An X-ray diffractometer, model D5005, from Siemens Germany, is used. The experimental conditions comprise: Cu target, Kα radiation, solid detector, a tube voltage of 40 kV, a tube current of 40 mA, step scanning with a scanning step of 0.02°, prefabrication period of 2 s, and scanning range in 5°-70°.

(4) The type of the acid center and the acid amount thereof are analyzed and determined by an in-situ pyridine adsorption infrared measurement method. Experimental instrument: model IFS113V, FT-IR (Fourier transform Infrared) spectrometer, from Bruker, USA. Experimental method for measuring the acid amount at 200° C. by using a pyridine adsorption infrared method: carrying out self-supporting tabletting on the sample, and sealing the sample in an in-situ cell of an infrared spectrometer, heating to 400° C., vacuumizing to 10$^{-3}$ Pa, keeping the temperature for 2 hours, and removing gas molecules adsorbed by the sample; then cooling to room temperature, adding pyridine vapor at a pressure of 2.67 Pa to keep an adsorption equilibrium for 30 min; followed by heating to 200° C., vacuumizing to 10$^{-3}$ Pa for desorbing for 30 min, cooling to room temperature, and performing spectrography, with a scanning wave number range: 1400 cm$^{-1}$-1700 cm$^{-1}$, so as to obtain the pyridine absorption infrared spectrogram of the sample desorbed at 200° C. According to the intensities of characteristic adsorption peaks at 1540 cm$^{-1}$ and 1450 cm$^{-1}$ in the pyridine adsorption infrared spectrogram, the relative amount of the total Brönsted acid centers (B-acid centers) and Lewis acid centers (L-acid centers) in the molecular sieve are obtained.

EXAMPLE I-1

An aluminum source of Al(OH) structure, an aluminum source of Al(OH)$_3$ structure, citric acid, ammonium bicarbonate and water at a molar ratio of 1:1:0.5:0.5:10 were mixed, stirred for 1 h, and the obtained mixture was aged for 3 h under the conditions of 130° C., 1 atm (absolute pressure, the same below) and 100 vol % of water vapor (the water vapor content in the atmosphere was 100 vol %, the same below), and the obtained solid was dried at 120° C. in an air atmosphere to obtain a precursor A of the alumina material.

The obtained precursor A was calcinated at 700° C. for 3 hours, and finally an alumina substrate according to the invention was obtained, which was marked as JZ1, and the physical and chemical property analysis data of the alumina substrate was shown in Table 1.

The alumina material precursor A comprised: on a dry basis, an Al$_2$O$_3$ content of 96.7 wt %, a Fe$_2$O$_3$ content of 0.3 wt %, a Na$_2$O content of 0.05 wt %, a SiO$_2$ content of 0.24 wt %, and a specific surface area of 356 m$^2$/g.

EXAMPLE I-2

An aluminum source of Al(OH) structure, an aluminum source of Al(OH)$_3$ structure, n-butylamine, and water at a molar ratio of 1:1:1:10 were mixed, stirred for 1 h, and the obtained mixture was aged for 3 h under the conditions of 130° C., 1 atm and 100 vol % of water vapor, and the obtained solid was dried at 120° C. in an air atmosphere, calcinated at 700° C. for 3 hours, and finally an alumina material according to the invention was obtained, which was marked as JZ2, and the physical and chemical property analysis data of the alumina substrate was shown in Table 1.

EXAMPLE I-3

An aluminum source of Al(OH) structure, an aluminum source of Al(OH)$_3$ structure, citric acid, ammonium bicarbonate and water at a molar ratio of 1:1:0.5:0.5:10 were mixed, stirred for 1 h, and the obtained mixture was aged for 3 h under the conditions of 130° C., 1 atm and 100 vol % of water vapor, and the obtained solid was dried at 120° C. in an air atmosphere to obtain a precursor A of the alumina material.

The obtained precursor A was calcinated at 500° C. for 3 hours, and finally an alumina substrate according to the invention was obtained, which was marked as JZ3, and the analytic characterization data of the alumina substrate was shown in Table 1.

EXAMPLE I-4

An aluminum source of Al(OH) structure, an aluminum source of Al(OH)$_3$ structure, citric acid, ammonium bicarbonate and water at a molar ratio of 1:1:0.5: 0.5:15 were mixed, stirred for 1 h, and the obtained mixture was aged for 2.5 h under the conditions of 130° C., 1 atm and 100 vol % of water vapor, and the obtained solid was dried at 120° C. in an air atmosphere, calcinated at 800° C. for 3 hours, and finally an alumina substrate according to the invention was obtained, which was marked as JZ4, and the physical and chemical property analysis data of the alumina substrate was shown in Table 1.

COMPARATIVE EXAMPLE I-1

An aluminum source of Al(OH) structure, an aluminum source of Al(OH)$_3$ structure, and water at a molar ratio of 1:1:10 were mixed, stirred for 1 h, and the obtained mixture was aged for 3 h under the conditions of 130° C., 1 atm and 100 vol % of water vapor (water vapor 100%), and the obtained solid was dried at 120° C. (in an air atmosphere, the same below), calcinated at 700° C. for 3 hours, and an alumina substrate was obtained, which was marked as DJZ1, and the analysis data of the alumina substrate was shown in Table 1.

COMPARATIVE EXAMPLE I-2

An aluminum source of Al(OH) structure, an aluminum source of Al(OH)$_3$ structure, citric acid, ammonium bicarbonate and water at a molar ratio of 1:1:0.5:0.5:10 were mixed, stirred for 1 h, and the obtained mixture was dried at 120° C., calcinated for 3 h at 700° C., and finally an alumina substrate was obtained, which was marked as DJZ2, and the analysis data of the alumina substrate was shown in Table 1.

COMPARATIVE EXAMPLE I-3

An aluminum source of Al(OH) structure, an aluminum source of Al(OH)$_3$ structure, citric acid, ammonium bicarbonate and water at a molar ratio of 1:1:0.5:0.5:10 were mixed, stirred for 1 h, and the obtained solution was aged for 3 h under the conditions of 130° C., 1 atm and water vapor, and the obtained solid was dried at 120° C., to obtain a precursor A of the alumina material; and the obtained precursor A was calcinated at 400° C. for 6 h, to obtain an alumina substrate, which was marked as DJZ3, and the analysis data of the alumina substrate was shown in Table 1.

COMPARATIVE EXAMPLE I-4

An aluminum source of Al(OH) structure, an aluminum source of Al(OH)$_3$ structure, glucose, and water at a molar ratio of 1:1:1:10 were mixed, stirred for 1 h, and the obtained solution was aged for 3 h under the conditions of 130° C., 1 atm and water vapor, and the obtained solid was dried at 120° C., calcinated at 700° C. for 3 hours, and an alumina substrate was obtained, which was marked as DJZ4, and the analysis data of the alumina substrate was shown in Table 1.

COMPARATIVE EXAMPLE I-5

An Al$_2$(SO$_4$)$_3$ solution at a concentration of 90 g Al$_2$O$_3$/L was added dropwise with aqueous ammonia under stirring until a pH=8 of the system was reached, at a neutralizing and gelling temperature of 55° C. Water glass in an amount of 60 g Si$_2$O/L was added under stirring, and heated to 80° C. for aging for 2 hours. The sodium ions were removed by ion exchange from the silica-alumina precipitate at 60° C. by using NH$_4$Cl solution at a weight ratio of the precipitate (dry basis):ammonium salt:H$_2$O of 1:0.8:10, wherein the ion exchange was conducted twice with 0.5 h for each time.

Then the obtained filter cake was re-pulped, a fluosilicic acid needed was dripped into the material slurry at a weight ratio of fluosilicic acid:material on dry basis:H$_2$O of 1:0.02:1:10, reacted at 60° C. for 1 hour, filtered, water washed, and dried at 120° C. for 15 hours, so as to provide an acid silica-alumina material substrate, which was marked as DJZS, and the analytical data was shown in Table 1.

COMPARATIVE EXAMPLE 1-6

(1) 22 g of pseudo-boehmite was added into 50 mL of deionized water for pulping for 10 min to prepare pseudo-boehmite pulp: 30 mL of 1 mol/L nitric acid solution was added dropwise into a pseudo-boehmite slurry to acidify and peptize, and continuously stirred for 10-15 min after the dropwise addition, to obtain the pseudo-boehmite sol.

(2) An aqueous solution of 0.03 mol of ammonium fluoroborate dissolved in 40 mL of deionized water was firstly added dropwise to the pseudo-boehmite sol, and then an aqueous solution of 13 g PEG dissolved in 40 mL of deionized water was added dropwise to obtain a first mixture.

(3) The first mixture was reacted at 60-90° C. for 6 h, cooled after the reaction, the pH was adjusted to 11 by using aqueous ammonia, and aged in a water bath at 75° C. for 24 h to obtain a second mixture.

(4) The second mixture was filtered and washed, dried at 80° C. for 13 h, and then calcined at 650° C. for 4 h (using a temperature program with a heating rate of 1° C./min) to produce a mesoporous alumina material (marked as alumina substrate DJZ6). The specific surface area was 29 m$^2$/g, the pore volume was 0.59 ml/g, the mode pore diameter was 12.1 nm, and the B/L-acid molar ratio was 1.1.

COMPARATIVE EXAMPLE I-7

An aluminum source of Al(OH) structure, an aluminum source of Al(OH)$_3$ structure, citric acid, ammonium bicarbonate and water at a molar ratio of 1:1:0.5:0.5:30 were mixed, stirred for 1 h, and the obtained mixture was aged for 6 h under the conditions of 130° C., 1 atm (absolute pressure, the same below) and 100 vol % of water vapor (the water vapor content in the atmosphere was 100 vol %, the same below), and the obtained solid was dried at 120° C. in an air atmosphere to obtain a precursor A of the alumina material; and the obtained precursor A was calcinated at 1100° C. for 1.5 h, to obtain finally an alumina substrate according to the present invention, which was marked as DJZ7, and the analysis data of the alumina substrate was shown in Table 1.

TABLE 1 characterization analysis data of the products

| | Ex. I-1 | Ex. I-1 | Ex. I-2 | Ex. I-3 | Ex. I-4 | CEx. I-1 | CEx. I-2 | CEx. I-3 | CEx. I-4 | CEx. I-5 | CEx. I-6 | CEx. I-7 |
|---|---|---|---|---|---|---|---|---|---|---|---|---|
| Sample No. | Precursor A | JZ1 | JZ2 | JZ3 | JZ4 | DJZ1 | DJZ2 | DJZ3 | DJZ4 | DJZ5 | DJZ6 | DJZ7 |
| Solid content, wt % | 62 | 95 | 94 | 93 | 95 | 94 | 95 | 95 | 95 | 72 | 92 | 92 |
| Na$_2$O content, wt % | 0.05 | 0.04 | 0.04 | 0.04 | 0.04 | 0.03 | 0.04 | 0.04 | 0.04 | 0.12 | 0.15 | 0.06 |

TABLE 1-continued characterization analysis data of the products

| | Ex. I-1 | Ex. I-1 | Ex. I-2 | Ex. I-3 | Ex. I-4 | CEx. I-1 | CEx. I-2 | CEx. I-3 | CEx. I-4 | CEx. I-5 | CEx. I-6 | CEx. I-7 |
|---|---|---|---|---|---|---|---|---|---|---|---|---|
| Sample No. | Precursor A | JZ1 | JZ2 | JZ3 | JZ4 | DJZ1 | DJZ2 | DJZ3 | DJZ4 | DJZ5 | DJZ6 | DJZ7 |
| $Al_2O_3$ content of wt % | 96.7 | 96.8 | 96.1 | 96.8 | 97.7 | 96.7 | 96.3 | 96.1 | 96.6 | 67.9 | 88.2 | 96.5 |
| $Fe_2O_3$ content, wt % | 0.3 | 0.25 | 0.24 | 0.26 | 0.21 | 0.25 | 0.25 | 0.25 | 0.24 | | 0.31 | 0.25 |
| $SiO_2$ content, wt % | 0.24 | 0.12 | 0.11 | 0.12 | 0.10 | 0.13 | 0.15 | 0.16 | 0.17 | 30.2 | 0.6 | 0.15 |
| Specific surface, $m^2/g$ | 356 | 278 | 256 | 289 | 268 | 342 | 323 | 121 | 222 | 389 | 219 | 246 |
| Total pore volume, mL/g | 0.3 | 0.42 | 0.4 | 0.37 | 0.42 | 0.32 | 0.33 | 0.26 | 0.33 | 0.93 | 0.59 | 0.36 |
| Pore volume of pores of 2-100 nm | | 0.37 | 0.35 | 0.35 | 0.37 | 0.29 | 0.29 | 0.28 | 0.28 | 0.54 | 0.43 | 0.30 |
| Pore volume of 10-20 nm pores | | 0.08 | 0.07 | 0.07 | 0.07 | 0.01 | 0.01 | 0.02 | 0.03 | 0.05 | 0.04 | 0.04 |
| Pore volume of 20-30 nm pores | | 0.08 | 0.08 | 0.07 | 0.07 | 0.01 | 0.02 | 0.04 | 0.03 | 0.04 | 0.03 | 0.03 |
| Pore volume of 30-40 nm pores | | 0.04 | 0.04 | 0.04 | 0.04 | 0.01 | 0.04 | 0.03 | 0.04 | 0.04 | 0.04 | 0.03 |
| Pore volume of 40-50 nm pores | | 0.04 | 0.03 | 0.03 | 0.03 | 0.01 | 0.02 | 0.02 | 0.02 | 0.02 | 0.02 | 0.02 |
| Crystallinity of γ-alumina % | 0 | 51.5 | 46.7 | 41.6 | 48.8 | 11.4 | 21.4 | 36.7 | 28.7 | 44 | 22.3 | 25.2 |
| Mode pore diameter, nm | 5 | 13 | 12 | 10 | 15 | 3 | 4 | 7 | 6 | 9 | 12.1 | 10 |
| Pore volume fraction of 2-5 nm pores % | 90 | 5 | 8 | 10 | 2 | 75 | 60 | 50 | 40 | 30 | 20 | 12 |
| Pore volume fraction of 5-10 nm pores % | 8 | 25 | 25 | 25 | 25 | 10 | 8 | 10 | 10 | 25 | 20 | 15 |
| Pore volume fraction of 10-100 nm pores*, % | 2 | 70 | 67 | 65 | 73 | 15 | 32 | 40 | 50 | 45 | 60 | 73 |
| B-acid amount (200° C.), μmol·$g^{-1}$ | 0 | 2.5 | 2.1 | 1.5 | 2.5 | 0.8 | 1.2 | 0.4 | 0.9 | 4.1 | 398 | 8.7 |
| L-acid amount (200° C.), μmol·$g^{-1}$ | 27 | 30.5 | 27.1 | 22.3 | 29.8 | 26.5 | 23.0 | 22.1 | 25.1 | 46.8 | 362 | 55.1 |
| B/L,% (200° C. C.) | 0 | 0.082 | 0.077 | 0.067 | 0.084 | 0.030 | 0.052 | 0.018 | 0.036 | 0.088 | 1.1 | 0.158 |

*the fraction was based on the total volume of pores of 2-100 nm in the alumina substrate material.

EXAMPLES I-5 to I-7

Alumina materials were prepared referring to the process of Example I-1, and the preparation process parameters and the product properties were shown in Table 1A.

TABLE 1A

| | Example No. | Ex. I-5 | Ex. I-6 | Ex. I-7 |
|---|---|---|---|---|
| | Alumina material No. | JZ5 | JZ6 | JZ7 |
| Raw material ratio | an aluminum source of Al(OH) structure, mol | 0.8 | 1.2 | 0.5 |
| | an aluminum source of Al(OH)$_3$ structure, mol) | 1.2 | 0.8 | 2 |
| | Name of pore-expanding agent | Activated carbon | Citric acid | N-butanol |
| | Amount of pore-expanding agent used, mol | 0.8 | 1.2 | 0.5 |
| | Water, mol | 12 | 8 | 5 |
| | Aging temperature, ° C. | 120 | 150 | 130 |
| | Aging period, h | 5 | 2 | 3 |
| | Drying temperature, ° C. | 150 | 150 | 150 |
| | Calcinating temperature, ° C. | 600 | 650 | 700 |
| | Calcination period, h | 5 | 4 | 3 |
| | Solid content, wt % | 94 | 93 | 93 |
| | Na$_2$O content of, wt % | 0.04 | 0.04 | 0.05 |
| | Al$_2$O$_3$ content, wt % | 96.8 | 96.2 | 96.7 |
| | Fe$_2$O$_3$ content, wt % | 0.25 | 0.24 | 0.32 |
| | SiO$_2$ content, wt % | 0.12 | 0.23 | 0.3 |
| | Specific surface, m$^2$/g | 262 | 272 | 242 |
| | Total pore volume, mL/g | 0.40 | 0.41 | 0.38 |
| | Pore volume of pores of 2 to 100 nm, mL/g | 0.35 | 0.34 | 0.31 |
| | Pore volume of >10-20 nm pores, mL/g | 0.07 | 0.07 | 0.06 |
| | Pore volume of >20-30 nm pores, mL/g | 0.07 | 0.06 | 0.06 |
| | Pore volume of >30-40 nm pores, mL/g | 0.04 | 0.04 | 0.04 |
| | Pore volume of >40-50 nm pores, mL/g | 0.03 | 0.03 | 0.03 |
| | Crystallinity of γ-alumina, % | 51.5 | 46.2 | 42.3 |
| | Mode pore diameter, nm | 13 | 12 | 10 |
| | Pore volume fraction of 2-5 nm pores, % | 5 | 6 | 8 |
| | Pore volume fraction of 5-10 nm pores, % | 20 | 22 | 25 |
| | Pore volume fraction of 10-100 nm pores, % | 75 | 72 | 67 |
| | B-acid (200° C.) | 1.9 | 1.1 | 1.5 |
| | L-acid (200° C.) | 30.5 | 15.2 | 16.6 |
| | B/L, % (200° C.) | 0.062 | 0.072 | 0.090 |

Referring to the low-temperature nitrogen adsorption and desorption characterization result, the alumina material according to the invention had more pores with the size of more than 10 nm. The alumina material according to the invention had continuous pore distribution in the pore diameter range of 2-100 nm.

The alumina material provided in Examples I-1 to I-7 had a crystalline phase structure of γ-alumina.

CATALYST PREPARATION EXAMPLE II-1

36.36 Kg of alumina sol was added into a reaction vessel, stirred, 27.78 Kg of pseudoboehmite (having a solid content of 72 wt %, manufactured by Shandong division of Aluminum Corporation of China) was added, 103.82 Kg of deca- tionized water (also referred to herein as acidic water) was added, 5.26 Kg of alumina substrate JZ1 and 39.41 Kg of kaolin were added under stirring for 40 min, stirred for 60 min and 4 Kg of hydrochloric acid having a concentration of 31 wt % was added, and stirred for 30 min. 116.7 Kg of the molecular sieve slurry (comprising 43.75 Kg of molecular sieve (dry basis) and 72.92 Kg of decationized water), stirred for 30 min, and spray-dried to obtain catalyst microspheres. The obtained catalyst microspheres were calcinated for 1 h at 500° C., washed twice, wherein each washing was conducted by using decationized water in an amount of 8 folds of the dry basis weight of the catalyst microspheres, and dried for 2 hours at a constant temperature of 120° C., to obtain a catalyst sample C1. The catalyst formulation and the physical and chemical properties of the product were shown in table 2.

CATALYST PREPARATION EXAMPLE II-2

36.36 Kg of alumina sol was added into a reaction vessel, stirred, 27.78 Kg of pseudoboehmite (having a solid content of 72 wt %, manufactured by Shandong division of Aluminum Corporation of China) was added, 103.82 Kg of deca- tionized water (also referred to herein as acidic water) was added, 5.26 Kg of alumina substrate JZ1 and 39.41 Kg of kaolin were added under stirring for 40 min, stirred for 60 min and 4 Kg of hydrochloric acid having a concentration of 31 wt % was added, and stirred for 30 min. 90 kg of the molecular sieve slurry (comprising 33.75 kg of molecular sieve and 56.25 kg of decationized water), stirred for 30 min, and spray-dried to obtain catalyst microspheres. The obtained catalyst microspheres were calcinated for 1 h at 500° C., washed twice, wherein each washing was conducted by using decationized water in an amount of 8 folds of the dry basis weight of the catalyst microspheres, and dried for 2 hours at a constant temperature of 120° C., to obtain a catalyst sample C2. The catalyst formulation and the properties of the product were shown in table 2.

CATALYST PREPARATION EXAMPLES II-3 TO II-8

Catalytic cracking catalysts were prepared according to the formulation ratio of feeds and process of Example II-2, wherein the catalyst preparation Example II-3 replaced the alumina substrate JZ1 of catalyst preparation Example II-2 with JZ2, the catalyst preparation Example II-4 replaced the alumina substrate JZ1 with JZ3, the catalyst preparation Example II-5 replaced the alumina substrate JZ1 with JZ4, the catalyst preparation Example II-6 replaced the alumina substrate JZ1 with JZS, the catalyst preparation Example II-7 replaced the alumina substrate JZ6 with JZ1, and the catalyst preparation Example II-8 replaced the alumina substrate JZ1 with JZ7. The formulation ratios and properties were shown in Table 2.

CATALYST PREPARATION EXAMPLE II-9

33.75 Kg of molecular sieve (dry basis) and 56.25 Kg of decationized water were pulped, with a solid content of 30% for the pulping, for 0.5 h; 30.79 Kg of kaolin, 10.52 Kg of alumina substrate JZ1 and 36.36 Kg of alumina sol were added and the mixture was further pulped for 2 hours, then 27.78 Kg of pseudo-boehmite and 4 Kg of hydrochloric acid having a concentration of 31 wt % were added and stirred for 1 hour, and finally 10.52 Kg of alumina substrate JZ1 was added and stirred for 1 hour to obtain catalyst microspheres. The obtained catalyst microspheres were calcinated at 750° C. for 2 h, washed twice, wherein each washing was conducted by using decationized water in an amount of 8 folds of the dry basis weight of the catalyst microspheres, and dried for 2 hours at a constant temperature of 120° C., to obtain a catalyst sample C9. The catalyst formulation and the properties of the product were shown in table 2.

CATALYST PREPARATION COMPARATIVE EXAMPLE II-1

116.7 Kg of the molecular sieve slurry (comprising 43.75 Kg of molecular sieve and 72.92 Kg of decationized water), stirred for 30 min, and spray-dried to obtain catalyst microspheres. The obtained catalyst microspheres were calcinated for 1 h at 500° C., washed twice, wherein each washing was conducted by using decationized water in an amount of 8 folds of the dry basis weight of the catalyst microspheres, and dried for 2 hours at a constant temperature of 120° C., to obtain a catalyst sample D1. The catalyst formulation and the properties of the product were shown in table 2.

COMPARATIVE CATALYST PREPARATION EXAMPLES II-2 TO II-7

Catalysts were prepared referring to the catalyst preparation Example II-2, except that the alumina substrate JZ1 was replaced with the substrates D JZ1-D JZ6 prepared in Comparative Examples I-1 to I-6, respectively.

CATALYST PPREPARATION COMPARATIVE EXAMPLES II-8

Catalyst was prepared referring to Example 3 of CN104014361B, except that the content of the molecular sieve (same as the molecular sieve used in Example II-2) was 27 wt %, the amount of the alumina sol was 8 wt %, the content of the pseudo-boehmite was 20 wt %, and the content of the modified bimodal pore alumina material (SKA 3) was 20 wt %. The catalyst was remarked as D8.

Catalyst Evaluation

The cracking reaction performance of the catalysts of the present invention and the comparative catalysts were evaluated.

The raw oil was inferior raw oil Sinopec Shanghai Gaoqiao Petrochemical Co., Ltd., and the physical and chemical property data was shown in Table 3.

Table 4 listed the results of the evaluations on a fixed fluidized bed apparatus. The catalysts were aged and deactivated by 100% water vapor at 800° C. for 17 hours, with a loading amount of the catalyst at 9 g, a catalyst-to-oil ratio of 5 (weight ratio), and a reaction temperature of 500° C.

Conversion=gasoline yield+liquefied gas yield+dry gas yield+coke yield

Light oil yield=gasoline yield+diesel yield

Liquid yield=liquefied gas+gasoline+diesel

Coke selectivity=coke yield/conversion

TABLE 2

| | Catalyst preparation Example No. | | | | | | | | | |
|---|---|---|---|---|---|---|---|---|---|---|
| | Ex. II-1 | Ex. II-2 | CEx. II-1 | CEx. II-2 | CEx. II-3 | CEx. II-4 | CEx. II-5 | CEx. II-6 | CEx. II-7 | CEx. II-8 |
| | | | | | Catalyst No. | | | | | |
| | C1 | C2 | D1 | D2 | D3 | D4 | D5 | D6 | D7 | D8 |
| Kaolin, wt % | 32 | 25 | 37 | 25 | 25 | 25 | 25 | 25 | 25 | 25 |
| Molecular sieves, wt % | 35 | 27 | 35 | 27 | 27 | 27 | 27 | 27 | 27 | 27 |
| Alumina sol, wt % | 8 | 8 | 8 | 8 | 8 | 8 | 8 | 8 | 8 | 8 |
| Alumina substrates No. | JZ1 | JZ1 | no | DJZ1 | DJZ2 | DJZ3 | DJZ4 | DJZ5 | DJZ6 | DJZ7 |
| Alumina substrate, wt % | 5 | 20 | | 20 | 20 | 20 | 20 | 20 | 20 | 20 |
| Pseudo-boehmite, wt % | 20 | 20 | 20 | 20 | 20 | 20 | 20 | 20 | 20 | 20 |
| Abrasion index, m %/h | 1.5 | 1.9 | 2.0 | 1.8 | 1.6 | 1.5 | 1.6 | 1.7 | 1.9 | 2.2 |
| Total pore volume, mL/g | 0.39 | 0.44 | 0.36 | 0.38 | 0.37 | 0.41 | 0.38 | 0.39 | 0.39 | 0.39 |
| Micro reaction activity (17 h)% | 75 | 79 | 72 | 71 | 71 | 70 | 71 | 71 | 70 | 71 |
| The fraction of 0-3 nm pores over 0-100 nm pores | 54 | 48 | 85 | 80 | 75 | 70 | 68 | 67 | 64 | 60 |
| The fraction of 5-100 nm pores over 0-100 nm pores | 31 | 46 | 10 | 15 | 18 | 22 | 23 | 24 | 26 | 28 |

| | Catalyst preparation Example No. | | | | | | |
|---|---|---|---|---|---|---|---|
| | Ex. II-3 | Ex. II-4 | Ex. II-5 | Ex. II-6 | Ex. II-7 | Ex. II-8 | Ex. II-9 |
| | | | | Catalyst No. | | | |
| | C3 | C4 | C5 | C6 | C7 | C8 | C9 |
| Kaolin, wt % | 25 | 25 | 25 | 25 | 25 | 25 | 25 |
| Molecular sieves, wt % | 27 | 27 | 27 | 27 | 27 | 27 | 27 |
| Alumina sol, wt % | 8 | 8 | 8 | 8 | 8 | 8 | 8 |
| Alumina substrates No. | JZ2 | JZ3 | JZ4 | JZ5 | JZ6 | JZ8 | JZ 1 |
| Alumina substrate, wt % | 20 | 20 | 20 | 20 | 20 | 20 | 20 |
| Pseudo-boehmite, wt % | 20 | 20 | 20 | 20 | 20 | 20 | 20 |
| Abrasion index, m %/h | 1.7 | 1.8 | 1.8 | 1.6 | 1.7 | 1.8 | 1.6 |
| Total pore volume, mL/g | 0.38 | 0.39 | 0.42 | 0.37 | 0.39 | 0.38 | 0.45 |
| Micro-reaction activity (17 h)% | 76 | 75 | 77 | 75 | 76 | 75 | 80 |
| The fraction of 0-3 nm pores over 0-100 nm pores | 49 | 49 | 46 | 46 | 47 | 47 | 48 |
| The fraction of 5-100 nm pores over 0-100 nm pores | 45 | 44 | 47 | 46 | 46 | 45 | 48 |

TABLE 3

| Analysis items | Components analyzed | Analysis data |
|---|---|---|
| Density | Density at 20° C., kg/m$^3$ | 993.1 |
| Four components | Saturated hydrocarbons, % (w) | 39.9 |
| | Aromatic hydrocarbons, % (w) | 47.25 |
| | Gums, % (w) | 11.55 |
| | Asphaltenes, % (w) | 1.3 |
| Carbon residue | Carbon residue, % (w) | 4.06 |
| Viscosity (co-flow method) | Viscosity at 100° C. mm$^2$/s | 9.28 |
| Vacuum distillation range | Initial boiling point, ° C. | 236 |
| | 5% (w), ° C. | 184.95 |
| | 10% (w), ° C. | 354.15 |
| | 30% (w), ° C. | 385.05 |
| | 50% (w), ° C. | 416.4 |
| | 70% (w), ° C. | 454 |
| | 90% (w), ° C. | 534.8 |
| | Distillation end-point yield, % (w) | 89.75 |
| | Temperature at the distillation end-point, ° C. | 536 |
| Total acid number | Total acid number, mgKOH/g | 0.05 |
| Basic nitrogen (dark oil) | Basic nitrogen, mg/kg | 840 |
| Sulfur content of heavy oil | Sulfur content, % (w) | 0.845 |
| Nitrogen content of heavy oil | Nitrogen content, % (w) | 0.287 |
| Metal content | Fe, mg/kg | 8.35 |
| | Ni, mg/kg | 3.7 |
| | V, mg/kg | 4.65 |
| | Na, mg/kg | 2.95 |
| | Ca, mg/kg | 1.45 |

TABLE 4

| | Catalyst | | | | | | | | |
|---|---|---|---|---|---|---|---|---|---|
| | C1 | C2 | C3 | C4 | C5 | C6 | C7 | C8 | C9 |
| Product yield, wt % | | | | | | | | | |
| Dry gas | 1.86 | 1.83 | 1.85 | 1.84 | 1.85 | 1.85 | 1.86 | 1.85 | 1.8 |
| Liquefied gas | 17.01 | 18.8 | 17.9 | 17.3 | 18.2 | 17.6 | 17.9 | 17.6 | 19.2 |
| Gasoline | 46.78 | 49.1 | 48.38 | 47.53 | 48.56 | 46.99 | 47.11 | 47.23 | 49.7 |
| Diesel oil | 14.22 | 12.4 | 12.99 | 13.45 | 12.78 | 13.89 | 13.69 | 13.63 | 11.8 |
| Heavy oil | 11.08 | 9.69 | 10.21 | 10.86 | 9.99 | 10.56 | 10.33 | 10.59 | 9.48 |
| Coke | 9.05 | 8.18 | 8.67 | 9.02 | 8.62 | 9.11 | 9.11 | 9.1 | 8.02 |
| Total | 100 | 100 | 100 | 100 | 100 | 100 | 100 | 100 | 100 |
| Conversion, % | 74.7 | 77.95 | 76.8 | 75.69 | 77.23 | 75.55 | 75.98 | 75.78 | 78.72 |
| Light oil yield, % | 61 | 61.46 | 61.37 | 60.98 | 61.34 | 60.88 | 60.8 | 60.86 | 61.5 |
| Coke selectivity, % | 12.12 | 10.49 | 11.29 | 11.92 | 11.16 | 12.06 | 11.99 | 12.01 | 10.19 |

| | Catalyst | | | | | | | |
|---|---|---|---|---|---|---|---|---|
| | D1 | D2 | D3 | D4 | D5 | D6 | D7 | D8 |
| Product yield, wt % | | | | | | | | |
| Dry gas | 1.86 | 1.88 | 1.87 | 1.92 | 1.88 | 1.89 | 1.91 | 1.9 |
| Liquefied gas | 16.6 | 16.1 | 16.3 | 15.5 | 15.4 | 15.1 | 15.4 | 16 |
| Gasoline | 44.86 | 44.56 | 44.02 | 44.8 | 44.62 | 44.98 | 44.82 | 45.33 |
| Diesel oil | 15.08 | 15.88 | 16.03 | 15.82 | 15.62 | 16.03 | 15.97 | 15.21 |
| Heavy oil | 12.41 | 12.36 | 12.11 | 12.23 | 12.87 | 12.19 | 12.22 | 12.02 |
| Coke | 9.19 | 9.22 | 9.67 | 9.73 | 9.61 | 9.81 | 9.68 | 9.54 |
| Total | 100 | 100 | 100 | 100 | 100 | 100 | 100 | 100 |
| Conversion, % | 72.51 | 71.76 | 71.86 | 71.95 | 71.51 | 71.78 | 71.81 | 72.77 |
| Light oil yield, % | 59.94 | 60.44 | 60.05 | 60.62 | 60.24 | 61.01 | 60.79 | 60.54 |
| Coke selectivity, % | 12.67 | 12.85 | 13.46 | 13.52 | 13.44 | 13.67 | 13.48 | 13.11 |

As could be seen from table 4, compared with the catalyst prepared according to the prior art, the catalysts prepared by the process of the present invention had the advantages of better cracking performance on inferior heavy oil, higher conversion rate, higher gasoline yield, lower heavy oil yield, higher light oil yield, higher liquefied gas yield and good coke selectivity, under the same usage amount of the molecular sieve. As could be seen from Examples II-2 to II-8, with lower contents of the molecular sieve, the catalyst C2-C8 according to the invention still had better cracking performances on the inferior-quality heavy oil, with higher conversion rate and higher gasoline yield compared with the catalyst provided by the Comparative Examples.

Catalysts C1-C8 and D1 were subjected to cycling pollution on a cycling aging unit (to deposit Ni and V), and the Ni and V contents of the cyclically polluted catalyst mixture were shown in Table 5, in which:

the cycling pollution procedure comprised the steps of: introducing heavy metals (Ni and V) into the catalyst mixture by the Michelle impregnation method, then loading the catalyst material introduced with the heavy metals into a small fixed fluidized bed, and treating on the small fixed fluidized bed device with steps of:

(a) heating to 600° C. at a heating rate of 20° C./min in a nitrogen atmosphere;

(b) heating to 780° C. at a heating rate of 1.5° C./min, keeping the temperature at 780° C., and changing the treatment atmosphere according to the following steps during the constant temperature process:

(i) treating in an atmosphere comprising 40 vol % of nitrogen (comprising 5 vol % of propylene) and 60 vol % of water vapor for 10 minutes, (ii) treating in an atmosphere comprising 40 vol % of nitrogen (pure nitrogen, free of propylene), 60 vol % of water vapor for 10 minutes, (iii) treating in an atmosphere comprising 40 vol % of air (comprising 4000 ppm SO$_2$), 60 vol % of water vapor for 10 minutes, and (iv) treating in an atmosphere comprising 40 vol % nitrogen and 60 vol % water vapor for 10 minutes; then repeating the steps (i)-(iv) once more in the aforementioned order, and then repeating step (i), to finish the cycling pollution procedure;

then, the aging step was carried out: aging the catalyst mixture after the cycling pollution at 800° C. for 8 hours in an atmosphere comprising 100 vol % of water vapor; and then, evaluating the catalytic performance of the catalyst mixture after the cycling pollution-aging on an ACE unit, wherein the raw oil (properties were shown in table 3) was brought into contact with the catalyst mixture at the bottom of the reactor, and the specific evaluation conditions and results were shown in table 5.

TABLE 5

| | Catalyst | | | | | | | | | | | |
|---|---|---|---|---|---|---|---|---|---|---|---|---|
| | C1 | C2 | C3 | C4 | C5 | C6 | C7 | C8 | C9 | D1 | D7 | D8 |
| Ni/ppm | 2020 | 2100 | 2020 | 2060 | 2000 | 2010 | 1990 | 2040 | 2030 | 2020 | 2010 | 2010 |
| V/ppm | 1980 | 2000 | 2000 | 2000 | 2010 | 2010 | 2000 | 1990 | 2010 | 2020 | 2020 | 2010 |
| Reaction temperature/° C. | | | | | | 510 | | | | | | |
| Catalyst-to-oil ratio/(C/O) | | | | | | 7 | | | | | | |
| Product yield, wt % | | | | | | | | | | | | |
| Dry gas | 1.86 | 2.06 | 2.04 | 2.02 | 2.05 | 2.05 | 2.01 | 1.99 | 2.04 | 2.24 | 1.86 | 2.11 |
| Liquefied gas | 16.01 | 16.8 | 16.42 | 16.39 | 16.59 | 16.34 | 16.25 | 16.21 | 16.9 | 15.81 | 16.23 | 16.02 |
| Gasoline | 44.78 | 47.53 | 46.23 | 46.56 | 46.98 | 45.21 | 44.99 | 45.89 | 47.99 | 39.81 | 39.79 | 41.89 |
| Diesel oil | 16.22 | 14.36 | 14.99 | 14.68 | 14.44 | 14.88 | 14.81 | 15.23 | 14.11 | 17.08 | 17.39 | 16.98 |
| Heavy oil | 10.28 | 9.78 | 9.89 | 10.38 | 10.01 | 10.23 | 10.56 | 10.12 | 9.65 | 12.58 | 12.89 | 12.22 |
| Coke | 10.85 | 9.47 | 10.43 | 9.97 | 9.93 | 11.29 | 11.38 | 10.56 | 9.31 | 12.48 | 11.84 | 10.78 |
| Total | 100 | 100 | 100 | 100 | 100 | 100 | 100 | 100 | 100 | 100 | 100 | 100 |
| Reaction characteristics | | | | | | | | | | | | |
| Conversion, % | 73.5 | 75.86 | 75.12 | 74.94 | 75.55 | 74.89 | 74.63 | 74.65 | 76.24 | 70.34 | 69.72 | 70.8 |
| Light oil yield, % | 61 | 61.89 | 61.22 | 61.24 | 61.42 | 60.09 | 59.8 | 61.12 | 62.1 | 56.89 | 57.18 | 58.87 |
| Coke selectivity, % | 14.76 | 12.48 | 13.88 | 13.30 | 13.14 | 15.08 | 15.25 | 14.15 | 12.21 | 17.74 | 16.98 | 15.23 |
| Micro-reaction activity (17 h), % | 73 | 77 | 74 | 73 | 74 | 71 | 70 | 70 | 777 | 66 | 65 | 68 |

As could be seen from Table 5, the catalytic cracking catalyst prepared by using the alumina substrate according to the invention had better metal pollution resistance; caused limited extent of reduction in the cracking activity compared with the unpolluted fresh catalyst; showed better cracking activity compared with the comparative catalyst; and resulted in higher conversion rate and higher gasoline yield, and higher light oil yield, compared with the polluted comparative agent.

The invention claimed is:

1. A catalytic cracking catalyst comprising a clay, a binder, a molecular sieve, and an alumina substrate material having a crystalline γ-alumina, wherein based on a total volume of pores with a diameter of 2-100 nm in the alumina substrate material, a pore volume of pores with a diameter of 2-5 nm accounts for 0-10%, a pore volume of pores with a diameter of more than 5 nm and not more than 10 nm accounts for 10-25%, and a pore volume of pores with a diameter of more than 10 nm and not more than 100 nm accounts for 65-90%, wherein the molecular sieve is one or more selected from the group consisting of Y-type molecular sieve, ZSM-5 molecular sieve and β-molecular sieve, wherein the alumina substrate material has a B-acid amount of 1-3 μmol·g$^{-1}$, a L acid amount of 10-40 μmol·g$^{-1}$, and a molar ratio of B-acid to L-acid of 0.06-0.1, and wherein the crystalline γ-alumina of the alumina substrate material has a crystallinity of 40-60%.

2. The catalytic cracking catalyst according to claim 1, wherein the alumina substrate material has a mode pore size in a range of 10-25 nm.

3. The catalytic cracking catalyst according to claim 1, wherein the alumina substrate material has an Al$_2$O$_3$ content of not less than 95 wt % on a dry basis.

4. The catalytic cracking catalyst according to claim 1, wherein the alumina substrate material has, on a dry basis, a Fe$_2$O$_3$ content of not more than 1.5 wt %, a Na$_2$O content of not more than 1 wt %, and a SiO$_2$ content of not more than 1.5 wt %.

5. The catalytic cracking catalyst according to claim 1, wherein the alumina substrate material has a specific surface area of 200-300 m$^2$/g and a total pore volume of 0.35-0.45 ml/g.

6. The catalytic cracking catalyst according to claim 1, wherein the total volume of pores with the diameter of 2-100 nm in the alumina substrate material is 0.25 to 0.40 ml/g.

7. The catalytic cracking catalyst according to claim 1, a pore volume of pores having a pore diameter of more than 10 nm and not more than 20 nm is 0.06 to 0.08 ml/g, a pore volume of pores having a pore diameter of more than 20 nm and not more than 30 nm is 0.06 to 0.08 ml/g, a pore volume of pores having a pore diameter of more than 30 nm and not more than 40 nm is 0.03 to 0.04 ml/g, and a pore volume of pores having a pore diameter of more than 40 nm and not more than 50 nm is 0.03 to 0.04 ml/g.

8. The catalytic cracking catalyst according to claim 1, wherein the alumina substrate material has the molar ratio of B-acid/L-acid of 0.065-0.085.

9. The catalytic cracking catalyst according to claim 1, wherein the catalytic cracking catalyst has a weight ratio of the molecular sieve to the alumina substrate material of 1-7:1 on a dry basis, and/or a total content of molecular sieve and said alumina substrate material in the catalytic cracking catalyst is in a range of from 30 to 55 wt %, based on a weight of the catalytic cracking catalyst.

10. The catalytic cracking catalyst according to claim 1, wherein the catalytic cracking catalyst has a bimodal pore structure, wherein based on the pores with a diameter in a range of 0-100 nm, the catalytic cracking catalyst comprises 30-55% of pores with a diameter in a range of more than 0 nm to 3 nm; and 30-55% of pores with a diameter in a range of 5-100 nm.

11. A process for preparing the catalytic cracking catalyst according to claim 1, comprising: pulping the binder, the clay, the molecular sieve and the alumina substrate material to obtain a catalyst slurry, and spray-drying the catalyst slurry.

12. The process according to claim 11, wherein the alumina substrate material is prepared by a process comprising:
mixing an aluminum source of Al (OH) structure, an aluminum source of Al (OH) 3 structure, a pore-expanding agent and water at a molar ratio of (0.5-2): (0.5-2): (0.5-2): (5-20);
carrying out an aging treatment in steam, and optionally drying, to obtain a precursor of the alumina substrate material, wherein the aging treatment is carried out at a temperature of 100-200° C., and the drying temperature is not more than 200° C.; and
calcinating the precursor of the alumina substrate material to obtain the alumina substrate material at a temperature of 500-1000° C.

13. The process according to claim 12, wherein the aluminum source of Al (OH) structure is one or more selected from the group consisting of pseudoboehmite and boehmite; and the aluminum source of Al (OH) 3 structure is one or more selected from the group consisting of gibbsite, bayerite, norite, nordstrandite, and amorphous aluminum hydroxide.

14. The process according to claim 12, wherein the pore-expanding agent is one or more selected from the group consisting of ammonium bicarbonate, activated carbon, EDTA, n-butylamine, polyacrylamide, n-butanol, and citric acid.

15. The process according to claim 12, wherein the molar ratio of the aluminum source of Al (OH) structure, the aluminum source of Al(OH)$_3$ structure, the pore-expanding agent, and water is (0.8-1.2): (0.8-1.2): (0.8-1.2): (8-12).

16. The catalytic cracking catalyst according to claim 1, wherein the catalyst comprises 25-50 wt % of the molecular sieve, 0-5010-40 wt % of the clay, 5-35 wt % of the binder, and 2-30 wt % of the alumina substrate material.

17. The catalytic cracking catalyst according to claim 16, wherein the catalyst comprises 25-35 wt % of the molecular sieve, 10-30 wt % of the clay, 15-28 wt % of the binder, and 5-25 wt % of the alumina substrate material.

* * * * *